United States Patent [19]
Popplewell et al.

[11] Patent Number: 6,090,419
[45] Date of Patent: *Jul. 18, 2000

[54] SALT COMPOSITIONS AND METHOD OF PREPARATION

[75] Inventors: Lewis M. Popplewell, Cockeysville; Michael A. Porzio, Monkton; Robert D. Heckner, Fallston, all of Md.

[73] Assignee: McCormick & Company, Inc., Sparks, Md.

[*] Notice: This patent issued on a continued prosecution application filed under 37 CFR 1.53(d), and is subject to the twenty year patent term provisions of 35 U.S.C. 154(a)(2).

[21] Appl. No.: 08/846,481

[22] Filed: May 1, 1997

Related U.S. Application Data

[60] Provisional application No. 60/016,690, May 2, 1996.

[51] Int. Cl.$^7$ ..................................................... A23L 1/237
[52] U.S. Cl. ............................ 426/96; 426/516; 426/649; 426/650; 426/658; 426/661; 426/806
[58] Field of Search .............................. 426/96, 649, 650, 426/658, 661, 516, 651, 806, 804

[56] References Cited

U.S. PATENT DOCUMENTS

| | | | |
|---|---|---|---|
| 462,730 | 11/1891 | Ongley | 426/649 |
| 4,216,244 | 8/1980 | Allen et al. | 426/649 |
| 4,380,553 | 4/1983 | Schmidt | 426/649 X |
| 4,560,574 | 12/1985 | Meyer | 426/649 |
| 4,801,460 | 1/1989 | Goertz et al. | 424/465 |
| 5,045,321 | 9/1991 | Makino et al. | 424/475 |
| 5,049,394 | 9/1991 | Howard et al. | 424/490 |
| 5,094,862 | 3/1992 | Bunick et al. | 426/649 X |
| 5,098,723 | 3/1992 | DuBois et al. | 426/649 X |
| 5,468,286 | 11/1995 | Wai-Chu et al. | 106/210 |
| 5,601,865 | 2/1997 | Fulger et al. | 426/651 X |
| 5,603,971 | 2/1997 | Porzio et al. | 426/96 |

FOREIGN PATENT DOCUMENTS

| | | | |
|---|---|---|---|
| 3-139258 | 10/1991 | Japan | 426/649 |

OTHER PUBLICATIONS

Notification of Transmittal of International Preliminary Examination Report issued Jul. 8, 1998 in PCT/US97/07393.

T. E. Furia et al., *Fenaroli's Handbook of Flavor Ingredients*, pp. 15–17 (1971).

*Primary Examiner*—Arthur L. Corbin
*Attorney, Agent, or Firm*—Oblon, Spivak, McClelland, Maier & Neustadt, P.C.

[57] ABSTRACT

Salt compositions containing:
(a) 10 to 90 wt. % of NaCl; and
(b) 10 to 90 wt. % of a binding matrix,
in which said NaCl is distributed throughout said binding matrix and may be prepared by mixing and heating the NaCl with the binding matrix to form a melt and then extruding the melt. These compositions are useful as salt compositions and as flavored salt compositions.

20 Claims, No Drawings

SALT COMPOSITIONS AND METHOD OF PREPARATION

This application claims priority to provisional application Ser. No. 60/016,690, filed May 2, 1996.

BACKGROUND OF THE INVENTION

1. Field of the Invention

The present invention relates to salt compositions which contain NaCl and a binding matrix. The present invention also relates to a process for preparing such salt compositions.

2. Discussion of the Background

Salt compositions are desired for at least two purposes. First, flavored salts are popular as seasonings for foods. Second, reduced-salt compositions are desirable for those people who enjoy salty taste but are on sodium-restricted diets.

Currently available commercial reduced-salt products are made by either replacement of NaCl with KCl via blending, or agglomeration of NaCl with fillers such as maltodextrin. In the case of agglomeration the product is expensive to produce, does not look like salt, and has limited versatility with regard to flavor/color addition, as well as incorporation of ingredients to provide specific functionality.

U.S. Pat. No. 5,094,862 discloses salt substitute granules in which an inner core comprising a nonsweet carbohydrate bulking agent is coated with sodium chloride by either agglomeration or spray coating followed by drying.

U.S. Pat. Nos. 4,556,566; 4,556,567; and 4,556,568 teach compositions in which a core of potassium chloride is coated with a maltodextrin ('567), a coating mixture of maltodextrin and sodium chloride ('566), and a coating mixture of maltodextrin, sodium chloride and cream of tarter (potassium bitartrate) ('568). However, such potassium salt substitutes exhibit a bitter organoleptic taste when used and thus have not been fully effective at replacing sodium chloride.

Thus, there remains a need for salt compositions which do not suffer from the above-mentioned drawbacks. Specifically, there remains a need for salt compositions which are not bitter, look like salt, and are amenable to the addition of flavors or colorants. There also remains a need for a process for preparing such salt compositions.

SUMMARY OF THE INVENTION

Accordingly, it is one object of the present invention to provide novel salt compositions.

It is another object of the present invention to provide novel salt compositions which are not bitter.

It is another object of the present invention to provide novel salt compositions which look like salt.

It is another object of the present invention to provide novel salt compositions which are amenable to the addition of a flavorant or colorant.

It is another object of the present invention to provide novel salt compositions which exhibit excellent storage properties.

It is another object of the present invention to provide a novel process for preparing such salt compositions.

These and other objects, which will become apparent during the following detailed description, have been achieved by the inventors' discovery that salt compositions, comprising:

(a) 10 to 90 wt. % of NaCl; and (b) 10 to 90 wt. % of a binding matrix, in which said NaCl is distributed throughout said binding matrix, look like salt, are not bitter, and have excellent storage properties.

The inventors have also discovered that such salt compositions may be prepared by a process comprising:

(i) mixing with heating a mixture of
  (a) 10 to 90 wt. % of NaCl; and
  (b) 10 to 90 wt. % of a binding matrix; to obtain a melt; and (ii) extruding said melt, to obtain said salt product.

DETAILED DESCRIPTION OF THE PREFERRED EMBODIMENTS

Thus, in a first embodiment, the present invention provides novel salt compositions which contain:

(a) 10 to 90 wt. %, preferably 30 to 60 wt. %, based on the total weight of the composition, of NaCl; and (b) 10 to 90 wt. %, preferably 40 to 70 wt. %, based on the total weight of the composition, of a binding matrix, in which said NaCl is distributed throughout said binding matrix in the form of discrete crystals as well as free ions.

The present salt compositions exist in a state in which granules of salt are distributed uniformly in a fused binding matrix. As will be described more fully below, the final composition may be prepared by grinding the cooled fracturable matrix mass. Thus, it is possible that in a final ground product there exists some exposed crystals of NaCl.

In the present compositions, the binding matrix exists as an amorphous solid with the specified NaCl crystals dispersed within the matrix mass as well as $Na^+$ cations and $Cl^-$ anions randomly dissolved within the binding matrix.

With certain binding matrix materials, e.g., those containing a plurality of the binder matrix either as a single component or as mixtures from the group: sugars, maltodextrins, corn syrup solids, or modified starches, the binding matrix may exist in a glassy state. In these cases it is preferred that the binding matrix have a glass transition temperature, Tg, of at least 35° C., preferably at least 40° C. The Tg of the binding matrix in the present compositions may be determined by differential scanning calorimetry (DSC), and the Tg reported as the mid-point temperature of the transition.

Although there is no strict limitation on the physical shape of the present salt compositions, the final product will typically be ground or otherwise shaped to resemble salt, i.e., table salt or rock salt. Thus, the final product will typically have a size of 0.2 to 10 mm, preferably 0.5 to 5.0 mm.

The NaCl used in the present product should be food grade. The NaCl used in the present composition may be iodized and thus contain about 0.01 wt. % of iodine, based on the total weight of NaCl.

It should be recognized that the particular size of the NaCl may be selected to meet the particular end use application. For example, "pretzel grade" salt may be prepared with NaCl having particle sizes that pass through a 35 mesh sieve (i.e., plus 35 mesh). "Shaker grade" products may be prepared from NaCl having from minus 35 to plus 60 mesh materials. "Popcorn grade", size salt substitute may be prepared from NaCl having minus 60 mesh particle sizes. However, when the present composition is prepared using the extrusion process described below, it is possible to use finely ground NaCl to prepare larger final products, e.g., "pretzel grade" salt.

As will be described more fully below, the final particulate form of the present composition is typically prepared by grinding a cooled extruded mass. Thus, size sorting is typically carried out after the grinding step. Once sorted, the final product should have less than about 10% of the granules which are finer than 100 mesh. All mesh sizes are by U.S. standard sieve size. The designation of a minus mesh size refers to material capable of passing through said mesh size screen. Whereas, a plus mesh size refers to material being retained on said mesh size screen.

It should be also noted that a portion of the NaCl may be replaced with another salty compound such as chloride salts and monosodium glutamate. Suitable chloride salts that may be employed to replace a portion of the sodium chloride include potassium chloride, ammonium chloride, and mixtures thereof and so forth. In the case of KCl, the addition of a flavorant to mask or balance any bitterness may be desired. When used, such materials are employed in amounts of about 10% to 50% by weight based on the weight of the sodium chloride.

The binding matrix may consist of the following type of ingredients, either alone or in combination: dextrins, sugars, modified starches, pre-gelled starches, hydrocolloids, proteins, gums, methylcelluloses, ethylcelluloses, corn syrup solids, and high-melting point fats. Cross-linking binding matrices such as alginate with calcium ions, may help preserve piece identity in some product applications. Additionally, natural products such as onion granules/powder, garlic granules/powder, capsicum granules/powder and spices may act as the binding matrix.

Suitable binding matrix materials include those described in U.S. Pat. Nos. 5,009,900, 5,124,162, 4,879,130, 4,820,534, 4,738,724, 4,707,367, 4,690,825, 4,689,235, 4,659,390, 4,610,890, 4,388,328, 4,230,687, 3,922,354, 4,547,377, 4,398,422, 3,989,852, 3,970,766, 3,970,765, 3,857,964, 3,704,137, 3,625,709, 3,532,515, 3,041,180, 2,919,989, 2,856,291, 2,809,985, 3,041,180, and U.S. patent application Ser. No. 07/948,437, filed on Sep. 22, 1992, now abandoned and Ser. No. 08/314,909, filed on Sep. 29, 1994, now abandoned all of which are incorporated herein by reference.

Most preferably (for most applications) the matrix will be comprised of bland tasting ingredients that solubilize/hydrate quickly in order to provide quick salt release.

When the binding matrix comprises a component which is sweet, it may be preferred to add a sweetness inhibiting agent. Suitable sweetness inhibiting agents are described in U.S. Pat. No. 5,094,862, which is incorporated herein by reference.

Specifically, suitable sweetness inhibiting agents include those compounds disclosed in U.K. Patent Application 2,157,148, and U.S. Pat. No. 4,567,053, both of which are incorporated herein by reference. The preferred sweetness inhibiting agents disclosed comprise two related series of compounds which are ethers or thioethers of acetic acid derivatives. The sweetness inhibiting compounds have the general formula:

$$A—(O)_m—C(B)(E)—COOX$$

where m represents 0 or 1; A represents a homocyclic or heterocyclic aromatic group; B represents hydrogen, a 1–3 carbon aliphatic group or phenyl; or, when m represents 0, A and B complete a homocyclic or heterocyclic aromatic group, or a methylene group substituted by a homocyclic or heterocyclic aromatic group; E represents hydrogen or alkyl or; when m represents 0, hydroxy or alkoxy; D represents oxygen or sulfur; X represents hydrogen or a physiologically compatible cation, with the proviso that m represents 1 when A represents phenyl and B and C both represent hydrogen; or when A represents unsubstituted phenyl, B represents alkyl and C represents hydrogen.

Other suitable sweetness inhibiting agents include the salts of substituted benzoylalkyl carboxylic acids disclosed in U.S. Pat. No. 4,544,565, which is incorporated herein by reference. These sweetness inhibiting agents have the general formula:

$$HOOC—CH(R7)CH(R8)—CO—R9$$

where R7 is hydrogen or C1–C3 alkyl, R8 is hydrogen or C1–C3 alkyl, and R9 represents a pentasubstituted phenyl group the substituents of which are independently selected from the group consisting of hydrogen, C1–C3 alkyl, C1–C3 alkoxy, C1–C2 hydroxyalkyl, hydroxy and carboxy.

Other suitable sweetness inhibiting agents include 3-aminobezenesulfonic acid and derivatives thereof disclosed in U.S. Pat. No. 4,642,240, which is incorporated herein by reference.

Other suitable sweetness inhibiting agents include the substituted phenylalkyl carboxylic acid salts and substituted phenyl ketoalkyl carboxylic acid salts disclosed in U.S. Pat. No. 4,567,053, which is incorporated herein by reference. These sweetness inhibiting agents have the general formula:

$$XOOC—(CO)_m(CH_2)_n—C_6H_4—(R)_p—$$

where m represents 0 or 1, and when m represents 0, n represents 1, 2 or 3 and p represents 1, 2, 3, or 4, and when m represents 1, n represents 1 or 2 and p represents 0, 1, 2, 3 or 4; the substituents R individually represent a lower alkoxy group, phenoxy group or a lower alkyl or trifluoromethyl group; two substituents R together represent an aliphatic chainlinked to the phenyl ring at two positions, or one substituent R represents a hydroxy group while at least one other substituent R represents an alkoxy group and X is a physiologically acceptable cation.

Other suitable sweetness inhibiting agents include the substituted benzoyloxy acetic and 2-propionic acid salt derivatives disclosed in U.K. Patent Application 2,180,534, which is incorporated herein by reference. These sweetness inhibiting agents have the general formula:

$$R1—C6H4—COO—CR2R3—COOH$$

where R1 is hydroxy or alkoxy containing 1 to 4 carbons, and R1 and an adjacent R2 together form a methylenedioxy ring, each R2 individually is selected from the group consisting of hydrogen, alkyl containing 1 to 3 carbons, alkoxy containing up to 2 carbons, hydroxy and carboxymethoxy group with the proviso that when R2 individually is a functional group of alkyl, alkoxy, hydroxy or carboxymethoxy, the number of functional groups will not exceed two; and R3 is hydrogen or methyl.

Preferred sweetness inhibiting agents are 2-p-methoxyphenoxypropionic acid manufactured under the trademark LACTISOLE by Tate & Lyle and p-methoxybenzylacetic acid and mixtures thereof.

The present compositions may further comprise materials selected from colorants, pigments, decolorants, oils, fats, preservatives, humectants, stickiness reducers, graining compounds, and so forth, and mixtures thereof, in varying amounts.

The colorants useful in the present invention may be water-soluble. A preferred pigment, titanium dioxide, may be incorporated in amounts up to about 1% by weight, based on the total weight of the composition. Also, the colorants may include other dyes suitable for food, drug and cosmetic applications, and known as F.D.&C. dyes and lakes. A full recitation of all F.D.&C. colorants and their corresponding chemical structures may be found in *Kirk-Othmer, Encyclopedia of Chemical Technology*, 3rd edition, Wiley, New York, Volume 6, at pages 561–595, which is incorporated herein by reference. The pigments and colorants when used are generally present in amounts up to about 1% by weight, preferably from about 0.01% to about 1% by weight, based on the total weight of the composition.

The colorant may also be oil soluble, e.g., oleopaprika.

Suitable preservatives include butylated hydroxyanisole (BHA), butylated hydroxytoluene (BHT), benzoic acid, ascorbic acid, methylparaben, propylparaben, ethylenediaminetetraacetic acid (EDTA), tocopherols and mixtures present in amounts up to about 1.0% by weight, preferably from about 0.1% to about 1.0% by weight, based on the total weight of the compositions.

Suitable humectants include glycerin, sorbitol, fructose and mixtures thereof. Humectants, when used, are generally present in amounts up to about 5% by weight, preferably from about 1.0% to about 5.0% by weight, based on the total weight of the composition.

Suitable surface stickiness reducers include mono- and diglycerides, and mixtures thereof. The stickiness reducers, when used, are present in amounts up to about 1.0% by weight, preferably from about 0.1% to about 1.0% by weight, based on the total weight of the composition.

Typically, the components other than NaCl and binding matrix, e.g. sweetness inhibitor, flavorant, etc., will be intimately associated with and distributed throughout the binding matrix. However, in certain cases, e.g. stickiness reducers, the extra component may be added after grinding an extruded product and will thus be present primarily on the surface of the ground particles.

The present salt compositions may further comprise a flavorant such as compounded flavors, oleoresins, essences, extracts, oils, seasoning blends, natural flavors, dried herbs and spices, and fresh or frozen herbs. Preferred flavorants include compounded liquid flavors, oleoresins, essences, oils, solid flavors, extracts, natural flavors, and dried herbs and spices. Specific flavorants include compounded onion/garlic flavors, oleoresin paprika, oleoresin capsicum, ground/granulated onion/garlic, dehydrated peppers, and ground basil.

In another embodiment, the present invention provides a novel process for preparing the present salt compositions, by:
 (i) mixing with heating a mixture of:
  (a) 10 to 90 wt. %, preferably 30 to 60 wt. %, based on the total weight of the mixture, of NaCl; and
  (b) 10 to 90 wt. %, preferably 40 to 70 wt. %, based on the total weight of the mixture, of a binding matrix, to obtain a melt; and
 (ii) extruding said melt, to obtain said salt composition.

In the present process the first step is typically carried out in the mixing chamber of an extruder. Suitable extruders are generally of a single or twin screw design with a heated jacket. The temperature required to form a melt will depend on the identity of the binding matrix and whether a plasticizer is being used.

Depending on the nature of the binding matrix it may be desired to include a plasticizer in the mixing step. Suitable plasticizers include water, ethanol, propylene glycol, glycerin, and water-based sugar solutions. Preferred plasticizers are water, propylene glycol, and glycerin. Typically, the plasticizer will be employed in an amount which is high enough to afford easy processing in the extruder, but low enough to result in a final product in which the binding matrix is in the form of a dry, stable solid. The plasticizer will typically be present in an amount of no more than 20 wt. %, preferably an amount of 0.1 to 8 wt. %, based on the weight of the mixture. Water-based sugar solutions may be used in amounts of 15–20 wt. %.

In some cases, it may be preferred to remove a portion of the plasticizer prior to extrusion. Suitable methods and apparatus for removing volatile components (in this case, plasticizer) by venting are described in U.S. patent application Ser. No. 07/948,437, filed Sep. 22, 1992, now abandoned and Ser. No. 08/314,909, filed Sep. 29, 1994, now abandoned which are incorporated herein by reference.

The present compositions will typically be extruded in the form of a rope. After cooling, the present compositions may then be milled or ground to the final desired shape and size. Suitable grinding apparatus include conical screen mill, hammer mill, and roller mill.

The composition is typically extruded through a die having a minimum cross-sectional dimension of at least 1/16 inch (0.0625 inch), preferably 1/8 inch to 3/8 inch (0.125 to 0.375 inch). The use of a die with a smaller minimum cross-sectional dimension may afford a product with inferior structural integrity or result in unacceptably high back pressures (unless an unacceptably high level of plasticizer is added).

The cross-sectional dimensions of the extruded product will closely match that of the die. Thus, the extruded product will typically have a minimum cross-sectional dimension of at least 1/16 inch, preferably 1/8 inch to 1/2 inch. The fact that the present process affords products with such large dimensions is a distinct advantage of both the present process and extruded product. Thus, the present process can yield a product having fairly large dimensions even when using NaCl having very small dimensions (a distinct advantage over spray coating processes). Moreover, the present extruded product may be ground to any selected size. This is particularly advantageous in situations where a fairly large product is desired, such as when the product will be stored or shipped in a porous container.

Certain types of optional ingredients, e.g. sweetness inhibitor, may be added to the mixture in the mixing chamber of the extruder. Other types of optional ingredients, e.g. stickiness reducer, may be added to the ground product.

Thus, the present invention provides a salt composition which is a salty-tasting particle with wide-ranging application. The present compositions deliver lower salt with similar (or increased) bulk and appearance and are useful as a general carrier/bulking agent for seasoning blends, etc.

The present compositions provide a salty tasting particle that delivers less sodium than a similarly sized piece of salt. The particles can resemble salt of virtually any size, but are most useful for replacing larger salt pieces that are typically used for topical applications, and to provide bulk and piece identity to seasoning blends.

The present salt compositions may be used as a substitute for natural salt in all applications that natural salt is employed. For example, shaker salt or table salt, salt to be used on other edible foods as well as salt of various particle sizes, such as pretzel salt and popcorn grade salt. When the salt is applied to edible food, it is simply applied like natural salt would be. The salt substitute clings or adheres to the food product the same way as natural salt.

The product particles can contain liquid/solid flavors, colors, or other functional adjuncts that provide specific attributes. One example of a functional adjunct is an agent used to reduce matrix sweetness.

Other features of the invention will become apparent in the course of the following descriptions of exemplary embodiments which are given for illustration of the invention and are not intended to be limiting thereof.

EXAMPLES

Example No. 1

A dry blend was prepared of the following components, 50% (w/w) salt, 30% (w/w) 42 DE corn syrup solids (Frodex 42, American Maize Co.) and 20% (w/w) modified waxy maize starch (Ultrasperse M, National starch Company). The blend was fed into a twin screw extruder at the rate of 200 grams/minute, the extruder heated to a jacket temperature of 260° F. and water added at the rate of 3 ml/min. A butter flavor was injected into the extruder melt at the rate of 5.0 ml flavor/min. to yield a plastic mass which rapidly solidifies into an amorphous matrix. The resulting flavored salt matrix was milled and sieved into a coarse particle size (retained on a +18 mesh screen). The flavored salt matrix was analyzed as containing 47.8% salt and had a moisture content of 3.5%. The coarse flavored salt matrix was tested by sprinkling on a soft dough pretzel and baking. Upon removal the flavored salt particles remain adhered to the pretzel and exhibited no change in particle character with baking. Upon tasting the baked pretzel, a strong butter flavor and salty impact were noticeable and complimentary.

Example No. 2

A dry blend consisting of the following components, 50 w/w% salt, 30% sucrose and 20% (w/w) of a modified waxy maize starch (Ultrasperse M, National starch Company) was prepared. The blend was fed into a twin screw extruder at the rate of 200 grams/minute and the extruder heated to a jacket temperature of 260° F. and water added at the rate of 1 ml/min. The resulting plastic matrix was cooled and solidified to yield a salty matrix exhibiting a glassy state (Tg=42° C.). The material was milled and sieved into various size fractions and analyzed. The salt content was determined to be 49.8% salt (+18 mesh), 49.4% salt (−18/+40 mesh) and 50.6% salt (through 40 mesh). The moisture contents were 1.7, 1.9 and 1.7%, respectively. The matrix was tested by sprinkling on a soft dough pretzel and baking. Following the baking process, the salt particles remain adhered to the pretzel and exhibited no change in particle character. Upon tasting, the pretzel exhibited the expected salty character.

Obviously, numerous modifications and variations of the present invention are possible in light of the above teachings. It is therefore to be understood that, within the scope of the appended claims, the invention may be practiced otherwise than as specifically described herein.

What is claimed is:

1. A process for preparing a composition, said process comprising:
   (i) mixing with heating a mixture comprising:
      (a) 10 to 90 wt. %, based on the total weight of said mixture, of NaCl;
      (b) 10 to 90 wt. %, based on the total weight of said mixture, of a binding matrix; and
      (c) a sweetness inhibitor or flavorant, to obtain a melt; and
   (ii) extruding said melt.

2. The process of claim 1, further comprising:
   (iii) grinding said composition.

3. The process of claim 1, wherein said mixture further comprises:
   (c) 0.0 to 20 wt. %, based on the total weight of said mixture, of a plasticizer.

4. The process of claim 3, wherein said plasticizer is present in an amount of 0.1 to 8 wt. %, based on the total weight of said mixture.

5. The process of claim 3, wherein said plasticizer is selected from the group consisting of water, ethanol, water-based sugar solutions, glycerin, and propylene glycol.

6. The process of claim 1, wherein said binding matrix is selected from the group consisting of starches, sugars, modified starches, dextrins, gums, proteins, sugar syrup solids, modified celluloses, and derivatives and mixtures thereof.

7. The composition of claim 1, wherein said mixture comprises: (a) 30 to 60 wt. %, based on the total weight of said mixture, of NaCl; and (b) 40 to 70 wt. %, based on the total weight of said mixture, of said binding matrix.

8. The process of claim 7, wherein said mixture further comprises:
   (c) 0.1 to 8 wt. %, based on the total weight of said mixture, of a plasticizer.

9. The process of claim 8, wherein said plasticizer is selected from the group consisting of water, ethanol, water-based sugar solutions, glycerin, and propylene glycol.

10. The process of claim 7, wherein said binding matrix is selected from the group consisting of starches, sugars, modified starches, dextrins, gums, proteins, sugar syrup solids, modified celluloses, and mixtures thereof.

11. A salt composition, prepared by a process comprising:
    (i) mixing with heating a mixture comprising:
       (a) 10 to 90 wt. %, based on the total weight of said mixture, of NaCl;
       (b) 10 to 90 wt. %, based on the total weight of said mixture, of a binding matrix; and
       (c) a sweetness inhibitor or flavorant, to obtain a melt; and
    (ii) extruding said melt.

12. The composition of claim 11, wherein said process further comprises:
    (iii) grinding said composition.

13. The composition of claim 11, wherein said mixture further comprises:
    (c) 0.0 to 20 wt %, based on the total weight of said mixture, of a plasticizer.

14. The composition of claim 13, wherein said plasticizer is present in an amount of 0.1 to 8 wt. %, based on the total weight of said mixture.

15. The composition of claim 13, wherein said plasticizer is selected from the group consisting of water, ethanol, water-based sugar solutions, glycerin, and propylene glycol.

16. The composition of claim 11, wherein said binding matrix is selected from the group consisting of starches, sugars, modified starches, dextrins, gums, proteins, sugar syrup solids, modified celluloses, and derivatives and mixtures thereof.

17. The process of claim 11, wherein said mixture comprises: (a) 30 to 60 wt. %, based on the total weight of said mixture, of NaCl; and (b) 40 to 70 wt. %, based on the total weight of said mixture, of said binding matrix.

18. The composition of claim 17, wherein said mixture further comprises:
    (c) 0.1 to 8 wt. %, based on the total weight of said mixture, of a plasticizer.

19. The composition of claim 18, wherein said plasticizer is selected from the group consisting of water, ethanol, water-based sugar solutions, glycerin, and propylene glycol.

20. The composition of claim 17, wherein said binding matrix is selected from the group consisting of starches, sugars, modified starches, dextrins, gums, proteins, sugar syrup solids, modified celluloses, and mixtures thereof.

* * * * *